Nov. 10, 1964 — C. O. MYLL — 3,156,490
PIPE CONNECTOR CONSTRUCTION
Filed June 6, 1960
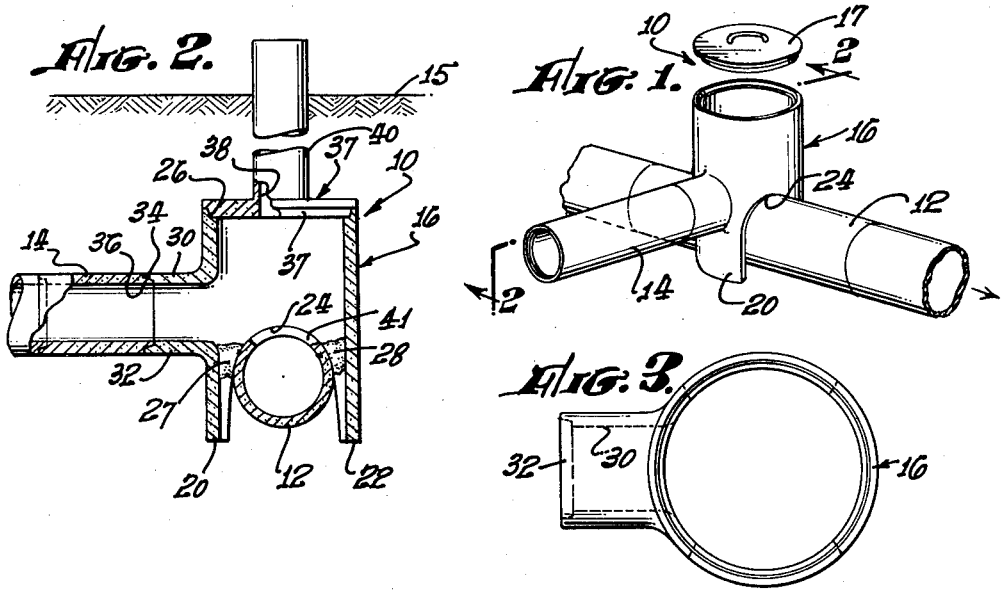
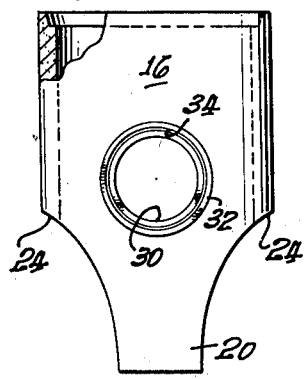
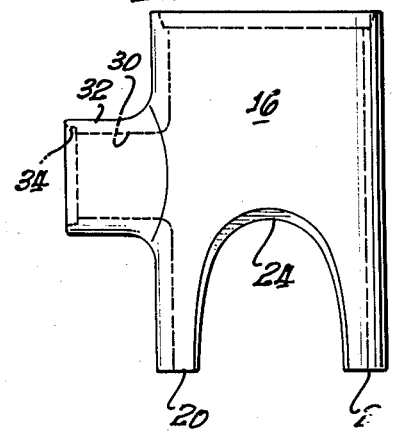
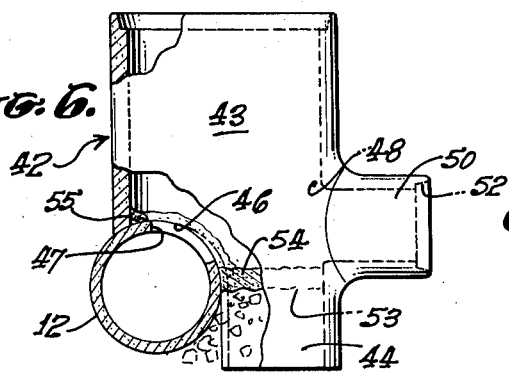
CLIFTON O. MYLL,
INVENTOR.
BY Knight & Rodgers
ATTORNEYS.

United States Patent Office 3,156,490
Patented Nov. 10, 1964

3,156,490
PIPE CONNECTOR CONSTRUCTION
Clifton O. Myll, Indio, Calif.
(P.O. Box 116, Coachella, Calif.)
Filed June 6, 1960, Ser. No. 34,143
4 Claims. (Cl. 285—121)

The present invention relates to pipe structures, and more particularly to a pipe connector structure for use particularly with pre-cast concrete or ceramic pipe.

In laying down pipe lines, it is often necessary to connect to a main or base line, a laterally extending line. This necessity is present for example in the case of the installation of a system of pipes for subsurface drainage of a parcel of land. Here, a main pipe line is installed which carries water, often at less than full capacity and under gravity flow. A series of smaller pipe lines are connected to and extend laterally from the main pipe line to conduct water from a large area to the main line. Such drain pipes serve to prevent water-logging or souring of the soil due to the presence of excess alkali.

In piping systems of the type above discussed, the pipe lines are ordinarily located some distance below the surface of the ground (e.g., 4 to 8 feet). A suitable tiling machine for installation of the drain tiles or pipe sections is preferably employed, which machine ordinarily digs a trench and is provided with a shielded box or casing moved along in the trench for a workman who has the duty of installing the pipe lines and also the connector for joining the lateral lines to the main pipe line. The casing keeps the sides of the trench from caving in, a necessity in soft, wet soils.

With the installation of each lateral, a hole must be made in the wall of the main pipeline, for the entry of water from the lateral into the main line. Also, the connection between the two lines must be effected. It is desirable that, after the entire drainage pipe system has been laid down, inspection may be made whenever desired of the amount of flow of water in the main pipeline, or in each lateral line.

Procedures for connecting a lateral line to a main line with ease and convenience have not been known in the art. Connection has sometimes been effected by means of a T-connection. This is most satisfactory when the T-connector is installed as a part of the main line; but even then considerable difficulties are encountered in properly locating the T to obtain accurate alignment with the lateral to be laid.

This type of joint is highly unsatisfactory when a lateral is to be connected to a main line already in place. The situation requires that an opening be made in the wall of the main line and a substantial amount of water may be lost as a result if the hydraulic gradient in the pipeline is above the opening. Water gushing from the line interferes with or even prevents the construction of a satisfactory T-joint. Even if the hydraulic gradient does not result in overflow of water, the T-joint is difficult and expensive to make since it requires considerable manual work and oftentimes fails in use unless properly constructed. It should be kept in mind that drainage lines are often laid below the water table in the soil so that the soil is soft and unstable. This is a hazardous condition demanding speed in pipe laying to be safe or economical. Thus there have been in known devices serious possibilities of human error in making a suitable connection between the main line and a lateral and this is true even though there are no unusual difficulties encountered. In addition, the conventional type of connection does not provide for the possibility of inspection of the flow in the lines, as mentioned above.

It is therefore an object of the present invention to provide a pre-formed drain tile connector structure that may be quickly and easily connected to a line already laid.

Another object of the invention is to provide a drain tile connector structure which can be installed with minimum effort on the part of the workman on the job.

Another object of the invention is to provide a connector structure which enables the connection of a lateral to a main pipeline running full without loss of water from the main line.

Another object of the invention is to provide a connector structure which will enable ready inspection of the flow of water through a main pipeline and flow from a lateral connected thereto.

Another object of the invention is to provide a connector structure of this character which can be installed by a workman while working inside the casing or shielded box of a tiling machine.

Another object of the invention is to provide a drain tile connector structure which can be connected to the lateral and all joints secured before the necessary opening is made into the associated main pipeline.

Another object of the invention is to provide a drain tile connector structure which is designed to be supported by the soil adjacent the main pipeline, instead of on the main pipeline.

These and other objects of the invention will become more readily apparent from the following description thereof, taken in conjunction with the accompanying drawings, in which:

FIG. 1 is a perspective of the connector structure of the invention, showing a main pipeline, partly broken away, and the first joint of a lateral line associated with said structure.

FIG. 2 is a vertical section taken along the line 2—2 of FIG. 1, the top surface of the soil within which the connector structure is located being shown diagrammatically and a lid with inspection tube being shown in closed position.

FIG. 3 is an enlarged top plan of the junction box of the invention.

FIG. 4 is a side elevation of the junction box of FIGS. 1–3.

FIG. 5 is a front elevation, partly broken away, of the connection box of FIGS. 1–4.

FIG. 6 is a side elevation, partly in section, of a modified form of the connector structure of the invention, shown connected to a main pipeline.

Referring now to the drawing, and particularly to FIG. 1, a pipe connector structure 10 is shown, such structure being preferably of pre-cast concrete, a suitable ceramic material, or other non-metallic material. Associated with the connector structure 10 is a main pipeline 12, and a lateral pipeline 14 of which the first joint is shown. The connector structure 10, the main pipeline 12, and the lateral pipeline 14 are located underground usually at a distance of perhaps 4 to 8 feet from the earth's surface 15 (FIG. 2).

The connector structure 10 is often referred to as a connection or junction box. The junction box has a cylindrical body 16 which may be provided with a cover 17, and at its lower end is shaped into the form of a saddle having two legs 20, 22. A curved seating surface 24 is formed between the legs 20 and 22, which is adapted to fit snugly against the cylindrical exterior surface of main pipeline 12 when the legs 20, 22 straddle line 12.

The legs 20 and 22 are of such length that they rest on the soil at the sides of the main pipeline 12, and support all or part of the weight of the junction box 10 when the latter is in the seated position shown in FIGS. 1 and 2. Their length is preferably about equal to the diameter of line 12, or somewhat greater.

The junction box is open at its upper end 26, and is there adapted to receive the cover 17 to close the opening. If it is desired to bring the opening at the end of the junction box closer to the ground surface, a section of pipe of the same diameter may be placed on top of body 16 to receive cover 17. Grout or other sealing material is preferably applied as at 27 and 28 to insure a substantially close fit between the legs 20 and 22, and the main pipeline 12. The sealing material may be omitted in some installations. This will be more likely in the case of pipelines laid below the normal water level in the surrounding soil since there the hydraulic head outside the pipe is in a direction to cause water to flow into the pipe rather than out of it.

The cylindrical body 16 is provided at one side thereof with a circular opening 30 around which the walls of the connector merge with outwardly projecting and horizontally extending generally cylindrical pipe seat 32. (See also FIGS. 4 and 5.) The seat 32 is formed at 34 to receive the mating end 36 of a section of lateral pipeline 14. The opening 30 is preferably located to be above main line 12, assuming the lateral to be at a higher elevation than the mainline at their junction. However, the opening can be lowered if desired to enable connection of a lateral at the same grade or elevation as the mainline.

The cover 37 in FIG. 2 is a variational form of closure for the top of cylinder 16, and is formed at its center with an opening 38. An inspection tube 40 of reduced diameter is secured to the cover in alignment with the opening 38, said inspection tube being adapted when the cover 37 is in the closed position of FIG. 2 to extend upwardly to or above the earth's surface 15. It is shown here as terminating a short distance above the ground level; but it may be buried a foot or two to permit cultivation of the soil around and above the inspection pipe without striking the top of the inspection pipe with a tractor or cultivator which might damage the tube.

The main pipeline 12 has an inlet 41 (FIG. 2) in the wall thereof, within the junction box 10. The inlet 41 has a purpose to be described herein below.

Referring to FIG. 6, a modified form of the invention is shown. Here, a connector 42 is provided having a cylindrical side wall 43 provided with a single leg 44. The connector 42 is formed with an arcuate seating surface 46 adapted to conform to the external curvature of the main pipeline 12. The leg 44 is of such length as to rest upon the soil at one side of the main pipeline 12, and to thus support at least in part the weight of the junction box 42 free from said main pipeline. When connected to a main line 12, an opening 47 is made in the wall of the main line at a location inside the connector. This is opposite the opening 48 in the cylindrical wall 43 which is an inlet to the connector from a lateral line. At opening 48 the connector has a short section 50 providing a seat 52 adapted to receive the end of a section of pipe in lateral 14.

In installing a connector of this character, gravel may be used to fill up the leg 44 to a level as indicated at 53. On top of this is a layer of grout, cement, or other sealing material as indicated at 54. The sealing material may be extended as at 55 to seal around the entire joint between the connector and main line 12, though the sealing material may be omitted, especially at 55, if desired.

The junction box 10 may be constructed by means of conventional pipe-making machinery, one end of the pipe being cast to form the legs 20, 22 and the desired seating surface or saddle 24. The entire unit may be cast as an integral unit, or the connection 32 for the lateral may be cast separately and then cemented in place. In this situation the cylindrical body 16 is formed in the same manner as a length of pre-cast concrete pipe, except for the saddle at one end. The opening 30 in the sidewall thereof is formed in any suitable manner. After complete setting has occurred, a mortar or similar material is applied to the outer surface of the sidewall 16, around the edges of the opening 30, for attaching the projection 32 to the cylindrical section 16.

The junction box 42 may be constructed in a manner similar to that above described for the construction of the junction box 16.

The pipe connector structure 10 is installed following installation of the main pipeline 12. A standard drain tile machine may be employed, by which a trench for the lateral 14 is made at right angles to the pipeline 12, and to a depth level with the uppermost surface of the main pipeline 12. The shielded box or casing of the drain tile machine is advanced in the trench to a point directly above the main pipeline 12. A workman, working in the casing, will clear some of the earth away from the main pipeline, and possibly replace such earth with gravel for better bearing. The junction box 10 is then lowered to the workman, and set in place by him in a position straddling the main pipeline 12. The workman can then install the first joint or section of the lateral pipeline 14. Grout or mortar at 27 and 28 may then be applied to obtain a tight fit, but such is not always necessary. The workman then, by any suitable means such as a punch and hammer, makes the inlet 41 in the main pipeline 12. Since the pipes are non-metallic, an opening can be made of any size at any point with simple hand tools. A lid 17 or 37 can then be placed in position on the seat at opening 26, and the installation of the connector pipe structure is completed. When the junction box 10 has been installed, water can flow from the lateral line 14 through the inlet 41 into the main line 12.

It will be noted that the legs 20 and 22 are most advantageously of such length as to support fully the weight of the junction box 10 and a cover 17 or 37. The purpose of the gravel which, as indicated above, is preferably placed around the main pipeline 12 and beneath the connector, is to help stabilize the soil under the connector and thus enable the legs 20 and 22 to perform their desired weight-supporting function.

The junction box 42 can be installed in the same manner as the junction box 10, and will function in the same manner as the latter.

Either junction box described can be installed by a workman while within the shielded box of a drain tile machine. A particular advantage is that the installation of the connector can be completed before the necessary opening 41 is made in the main pipeline 12. This latter feature of the invention is particularly important when installations are to be made at points where the hydraulic gradient in the main pipeline is at an elevation greater than that of the point of connection of the lateral.

The use of the pre-cast junction box also eliminates the need of forming T connections by workmen while on the job. This is a difficult task to do quickly and accurately working in a narrow trench, and is often a source of trouble in laying lines of this character.

An additional advantage of the invention is that it simplifies inspection of the drain lines at their points of connection. Such inspection requires at most only digging down a few feet through the earth, and the removal of the cover 17. The flow of water in the main pipeline as well as the discharge into the main line from the lateral pipeline can be easily observed. If an inspection tube such as the tube 40 is employed as shown in FIG. 2 even the necessity of the digging will be eliminated when the inspection tube rises to the earth's surface.

Although the invention has been described with reference to particular embodiments thereof, it will be realized that various changes therein will occur to persons skilled in the art and may be made without departing from the spirit of the invention and the scope of the appended claims.

What is claimed as new and desired to be protected by Letters Patent is as follows:

1. A sub-surface drain pipe system comprising in combination a section of base line non-metallic hollow pipe extending generally horizontally; a lateral line of non-metallic hollow pipe also extending in a generally horizontal direction at an angle to the base line pipe; and a connector of non-metallic material extending above the base line pipe and connecting the lateral to the base line pipe; said connector comprising a hollow body open at least at the bottom and of larger diameter than the maximum diameter of the base line pipe, said body having downwardly facing surfaces shaped to mate with the exterior surface configuration of the base line pipe and adapted to rest upon the base line pipe; said connector also including leg means extending downwardly substantially in prolongation of the downwardly facing surfaces and of the body walls into engagement with the ground independently of the base line pipe to maintain the connector in an upright position relative to the base line pipe; said leg means being disposed at least at one side of the base line pipe; and said body having at one side means forming a lateral opening in communication with the interior of said connector located generally above the base line pipe and adapted for connection to the end of said lateral pipe line; said base line section having means forming an opening in the upper wall thereof and in communication with the interior of the connector whereby to admit to the base line pipe fluid flowing into the connector from the lateral line pipe.

2. The invention defined in claim 1 including sealing material positioned about the said means forming the opening in the upper wall of the base line pipe and adjacent structures of the connector.

3. The invention defined in claim 1 including an inspection opening in the top of said hollow body portion of the connector.

4. A sub-surface drain pipe system containing water flowing under gravity head only, comprising in combination:
a section of base line of non-metallic pipe of generally cylindrical configuration and extending generally horizontally;
a lateral line of non-metallic pipe of generally cylindrical configuration also extending in a generally horizontal direction at an angle to the base line;
and a connector of non-metallic material extending above the base line and connecting the lateral to the base line section;
said connector having a hollow cylindrical body open at the top and of larger diameter than the base line, said body having downwardly facing concave surfaces resting upon the base line section;
said connector also having leg means extending downwardly substantially in prolongation of the body walls into engagement with the ground independently of the base line to maintain the connector in an upright position relative to the base line, said leg means being disposed substantially at one side of the base line;
and said body having at one side an integral pipe seat of cylindrical configuration located generally above the base line and adapted for connection to the end of said lateral line;
said base line section having an opening in the upper wall thereof and within the connector body to admit to the base line water flowing into the connector from the lateral;
and a cover resting on top of the body to close the open upper end thereof.

References Cited in the file of this patent
UNITED STATES PATENTS

| | | |
|---|---|---|
| 186,351 | Leland | Jan. 16, 1877 |
| 1,760,314 | Murray | May 27, 1930 |
| 1,936,081 | Clayton | Nov. 21, 1933 |
| 1,946,237 | Robertson | Feb. 6, 1934 |
| 2,236,801 | McDonald | Apr. 1, 1941 |
| 2,236,937 | Clark | Apr. 1, 1941 |
| 2,555,303 | Collins | June 5, 1951 |
| 2,736,335 | Webber | Feb. 28, 1956 |
| 2,736,949 | Kraemer | Mar. 6, 1956 |
| 2,756,486 | Smith | July 31, 1956 |
| 2,790,652 | Risely et al. | Apr. 30, 1957 |

FOREIGN PATENTS

| | | |
|---|---|---|
| 8,272 | Great Britain | Apr. 26, 1894 |